United States Patent [19]

Iwami et al.

[11] Patent Number: 4,829,294
[45] Date of Patent: May 9, 1989

[54] DOCUMENT PROCESSING METHOD AND SYSTEM USING MULTIWINDOW

[75] Inventors: Hidefumi Iwami, Yokohama; Kuniaki Tabata; Tetsuo Machida, both of Tokyo; Tuguo Miyake, Isehara; Fumiya Murata, Hadano, all of Japan

[73] Assignee: Hitachi, Ltd., Tokyo, Japan

[21] Appl. No.: 65,609

[22] Filed: Jun. 23, 1987

[30] Foreign Application Priority Data

Jun. 25, 1986 [JP] Japan .................................. 61-150242
Sep. 10, 1986 [JP] Japan .................................. 61-211581

[51] Int. Cl.$^4$ ............................................. G09G 1/00
[52] U.S. Cl. ..................... 340/723; 340/721; 364/521
[58] Field of Search ............... 340/723, 724, 721, 706, 340/709; 364/518, 521, 523

[56] References Cited

U.S. PATENT DOCUMENTS 4,533,910  8/1985  Sukonick et al. ................ 340/724
4,555,775  11/1985  Pike .................................. 340/724
4,642,621  2/1987  Nemoto et al. ................... 340/721

OTHER PUBLICATIONS

Nikkei Communication, Feb. 10, 1986, pp. 69-103, New Generation Work Station, Nikkei McGraw Co., Ltd.

Primary Examiner—John W. Caldwell, Sr.
Assistant Examiner—Jeffery A. Brier
Attorney, Agent, or Firm—Fay, Sharpe, Beall, Fagan, Minnich & McKee

[57] ABSTRACT

In a document processing method using a multiwindow including a display device having a display screen on which a plurality of windows are established, a virtual screen memory in which a plurality of virtual screens each corresponding to programs are generated to output results of data processing by programs, a memory unit for storing therein a window control table defining corresponding relationships between the virtual screens and the windows, and a control device for referencing the window control table and for outputting contents of each virtual screen in a window associated with the virtual screen on the display screen, copy source attribute data including an identifier of a second window established in the display screen and data defining a second partial region in the second window is memorized in correspondence with a first partial region on the vertical screen so that, in response to a command inputted by an operator while painting to the first partial region displayed in the first window, the display contents of the second partial region of the second window are copied into the first partial region of the first window based on the copy source attribute data stored on the virtual screen corresponding to the first window.

10 Claims, 14 Drawing Sheets

| DISPLAY LEVEL | POSITION OF REPRESENTATIVE POINT OF WINDOW | | | | WINDOW SIZE | |
|---|---|---|---|---|---|---|
| | DISPLAY SCREEN | | VIRTUAL SCREEN | | | |
| | X COORDI-NATE | Y COORDI-NATE | X COORDI-NATE | Y COORDI-NATE | HORIZONTAL SIZE | VERTICAL SIZE |
| W1 | | | | | | |
| W2 | | | | | | |
| | | | | | | |

| | 41 | 42 — Position of Representative Point of Window — 43 | | | | 44 — Window Size — | | 45 | 46 |
|---|---|---|---|---|---|---|---|---|---|
| | Display Level | Display Screen | | Virtual Screen | | Horizontal Size | Vertical Size | Program Identifier | Data Store Address |
| | | X Coordinate | Y Coordinate | X Coordinate | Y Coordinate | | | | |
| W1 | | | | | | | | | |
| W2 | | | | | | | | | |
| ---- | | | | | | | | | |

| 68A' | 68A" | 68B | 68C | 68D |
|---|---|---|---|---|
| Identifier of Program Used in Copy Source | Data Store Address Used in Copy Source | X and Y Coordinate of Representative Point (P) of Copy Source Region | Size (a,b) of Copy Source Region | Copy Parameter |

| | FILE NAME | | ~171 |
|---|---|---|---|
| | TOTAL NUMBER OF DATA | | ~172 |
| 191~ | DATA NO. | | ~173 |
| | GRAPH TYPE | | ~174 |
| | GRAPH TITLE CHARACTER STRING | | ~175 |
| | ABSCISSA UNIT CHARACTER STRING | | ~176 |
| 1ST DATA | ABSCISSA HEADER CHARACTER STRING | | ~178 |
| | ORDINATE UNIT CHARACTER STRING | | ~179 |
| | ORDINATE HEADER CHARACTER STRING | | ~180 |
| 181A~ | ORDINATE INTERVAL NAME 1 | DATA VALUE 1 | ~181B |
| 182A~ | 2 | 2 | ~182B |
| | ⋮ | ⋮ | |
| 192~ 2ND DATA | | | |

DOCUMENT PROCESSING METHOD AND SYSTEM USING MULTIWINDOW

CROSS-REFERENCE OF THE RELATED APPLICATIONS

This application relates to a U.S. application Ser. No. 594,690 filed Mar. 29, 1984, now issued at U.S. Pat. No. 4,716,404, dated Dec. 29, 1987, entitled "Image Retrieval Method and Apparatus Using Annotations As Guidance Information" by Kuniaki Tabata and Susumu Tsuhara, and assigned to the present assignee, which is incorporated into the disclosure of this application by reference.

BACKGROUND OF THE INVENTION

This present invention relates to a document processing method and a document processing system each using a multiwindow, and in particular, to a document processing method and a document processing system in which a display content of a window established in a display screen is copied into a specified region of another window and which is suitable for generating a document including a patch region.

A display system having a function to display an edited image, a portion of which is obtained by insetting a partial image extracted from another image, is proposed, for example, in a U.S. application Ser. No. 594,690, now U.S. Pat. No. 4,716,404 dated Dec. 29, 1987, by K. Tabata et al. Further, a multiwindow system has been developed recently as an apparatus to support office jobs which has a function to display a plurality of windows on a screen at the same time, to extract a portion of document materials or original data displayed in a window, and to bring the extracted portion into a portion of a new document being generated in another window. A system capable of the document processing accomplished by an extracting and insetting operation of another original data as described above has been described e.g. in the "Nikkei Communication", Feb. 10, 1986, pp. 69–103, the "Nikkei Communication" being issued every second week from the Nikkei McGraw Co., Ltd.

In the multiwindow system, application programs are assigned to the respective windows to enable the users to concurrently access a plurality of programs. Each program, assuming a window assigned thereto as a dedicated terminal equipment, outputs a processing result in response to an instruction from the user. Consequently, in a case where a document comprising, for example, a text region and graph region is desired, a character input operation on the text region is achieved in a first window by use of a first program having a document processing function and a desired graph is subsequently drawn in a second window by using a second program including a function to automatically draw graph from numeric data inputted thereto; finally, a particular region (copy source region) including the graph specified in the second window is extracted and is moved into a specified region (copy destination region) in the first window, which enables to generate a document having a complex content at a high speed by effectively using the functions of the respective programs.

However, in the prior art multiwindow system, for an update of the content of the copy destination region of the document generated by combining the processing results of the plurality of application programs, even when the sizes and position of the copy source and destination regions are unchanged, the sizes and the positions are required to be specified for each copy operation. As a consequence, when a document processing is achieved by combining the contents generated in another window in a trial-and-error fashion, the operator must repeatedly effect a complex operation.

Moreover, in the example above, after the second window in cleared in the screen, if the content of the copy region to the first window is required to be changed, the operator must achieve a procedure to restore the copy source region by setting the window, initiating the second program, and reading the previously used data from the file.

SUMMARY OF THE INVENTION

It is therefore an object of the present invention to provide a document processing method and a document processing system each facilitating the change or modification of the contents of a document generated by use of the multiwindow.

Another object of the present invention is to provide a document processing method and a document processing system capable of automatically calling a program related to a document generated in a window into another window on the display screen.

In order to accomplish the objects, according to the present invention, there is provided a document processing method using a multiwindow system including a display device having a display screen in which a plurality of windows are established, virtual screen memory means in which a plurality of virtual screens each corresponding to programs are formed to output results of data processing by programs, memory means for storing therein a window control table defining corresponding relationships between the virtual screens and the windows, and control means for referencing the window control table and for outputting contents of each said virtual screen in a window associated with the virtual screen on the display screen, said method comprising the steps of:

a first step for memorizing copy source attribute data including an identifier of a second window established on the display screen and data defining a second partial region in the second window with a correspondence with respect to a first partial region in a first window established on the display screen;

a second step for outputting to the second window results of data processing effected by use of a program; and a third step, responsive to a command inputted by an operator while pointing to or designating the first partial region displayed in the first window, for copying the display contents of the second partial region of the second window into the first partial region of the first window based on the copy source attribute previously memorized corresponding to the first partial region.

The first step, for example, to copy display data of the second partial region into the first partial region, is executed in response to a first copy command inputted by the operator while specifying the first partial region as a copy destination in the first window and the second partial region as a copy source in the second window.

According to the present invention in order to copy the contents displayed in the second window of the display screen into a document being displayed in the first window, only if the position and the size of the partial region as the copy destination and those of the partial region as the copy source are first specified by the operator, the copy operation can be automatically achieved with a simple command input when the copy source is changed thereafter.

According to a second embodiment of the present invention, the copy source attribute data stored in association with the first partial region includes an identifier of a program to generate document material to be copied into the first partial region, a store address of data used by the program, and data defining the second partial region in the virtual screen in which the results of data processing of the program are stored. With the provision of the copy source attribute data, in response to a command inputted by the operator to call the copy source onto the display screen while pointing to the first partial region displayed in the first window, a program indicated by the copy source attribute data can be automatically initiated so as to display on the second window of the display screen document material attained by processing data read from the defined address.

According to the second embodiment, when document data generated in the first window and stored in a data file is thereafter called into a window again, the display of the copy source corresponding to the first partial region can be effected through a simple operation. Consequently, an environment to modify data of the copy source can be supplied to the operator at a high speed. Moreover, after the data of the copy source is modified, the display content of the copy source can be copied into the first partial region also through a simple operation like in the first embodiment.

BRIEF DESCRIPTION OF THE DRAWINGS

The foregoing and other objects, manner of operation and novel features of the present invention will be understood from the following detailed description when read in connection with the accompanying drawings in which:

FIG. 9 is a schematic diagram illustrating the configuration of the window control table used in a second embodiment of the present invention;

FIG. 10 is a schematic diagram illustrating the primary portion of a virtual screen data record used in the second embodiment of the present invention;

FIG. 17 is a schematic diagram illustrating the format of copy source data record by use of an example of graph data.

DESCRIPTION OF THE PREFERRED EMBODIMENTS

Figure 1:
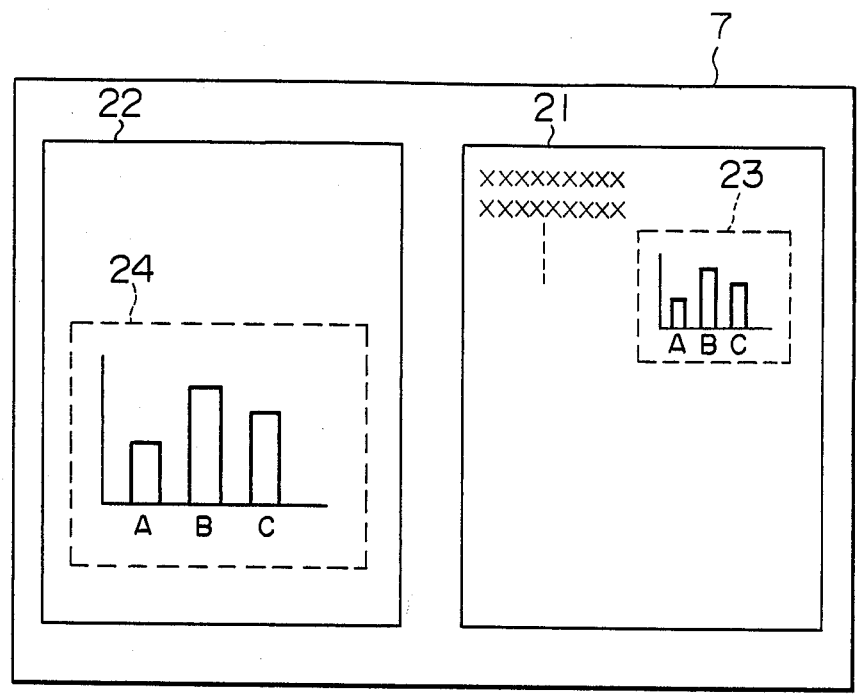
FIG. 1 is a schematic diagram for explaining relationships between a copy destination region and a copy source region in a display screen.

First, referring to FIG. 1, a description will be given of a document creation through a patching (copy) operation using the mutliwindow. FIG. 1 shows a display screen 7 in which two windows 21-22 are established. In the first window 21, a document including a text indicated by X's is generated, for example, by use of a document processing program having a word processing function; whereas, in the second window 22, information to be patched or copied into a subregion specified in the first window 21 is created. For example, in the case where the information to be patched is a graph, a program dedicated to a graph is used in the second window 22, the program having a function which enables to automatically draw a graph only by specifying a graph type such as a bar chart or a broken-line chart, display items of the abscissa and the ordinate, and numeric data to be displayed as a graph. FIG. 1 is a schematic diagram illustrating a state where a subregion 24 including a graph is sliced in the second window and the contents of the subregion 24 are copied into a subregion 23 of the first window. When the size of the subregion (to be referred to as a copy source region herebelow) 24 including original information is different from the size of the subregion (to be referred to as a copy destination region) 23 in which the copy is effected, the image extracted from the copy source region 24 is enlarged or reduced according to the size of the copy destination region 23. When a table is required in a copy destination, a program having a table generate function is used in the second window. A portion of another document already created in advance may be used as a copy source to copy the contents thereof into a copy destination region.

Figure 2:
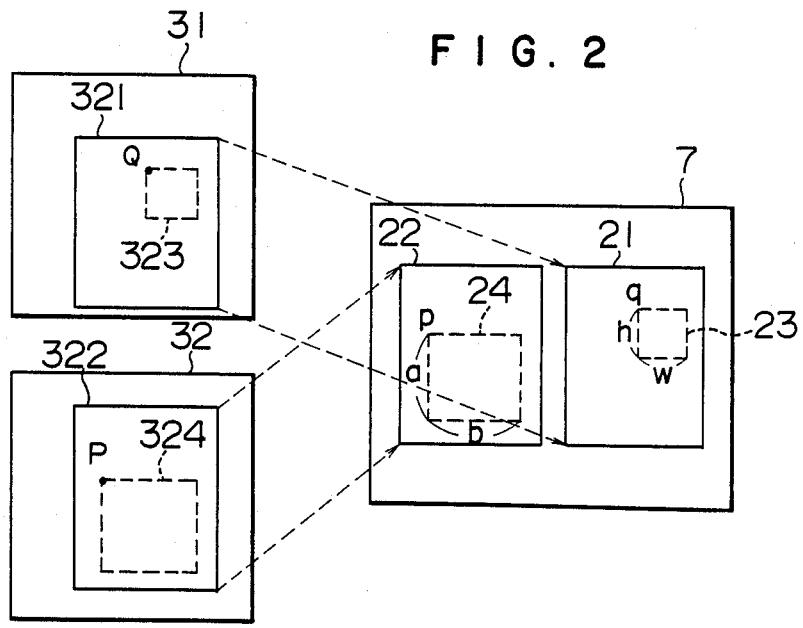
FIG. 2 is an explanatory diagram useful for explaining relationships between windows and virtual screens.

The windows 21-22 established in the display screen 7, as conceptually shown in FIG. 2, respectively correspond to virtual screens 31-32 generated in a virtual screen memory 8 which will be described later, and the contents of partial regions 321 and 322 in the virtual screens 31 and 32, respectively are displayed on the actual screen 7. Ordinarily, the sizes of the partial regions 321-322 in the virtual screens 31-32 are respectively matched with the sizes of the windows 21-22; however, the contents of the partial regions 321-322 may be magnified or reduced before the contents are displayed in the respective windows 21-22. Each of application programs for a graph generation, a document processing, and the like handles a corresponding virtual screen as a display device dedicated thereto and outputs the processing results to the virtual screen. The copy destination region 23 specified in the window 21 in the actual screen and the copy source region 24 specified in the window 22 therein respectively correspond to the partial region 323 in the virtual screen 31 and the partial region 324 in the virtual screen 32. The feature of the present invention resides in that when an operation to copy the contents of the copy source region 24 into the copy destination region 23 is made while designating in the actual screen 7 the position P and the size (a, b) of the copy source region and the position q and the size (h, w) of the copy destination region, the position and the size of the copy source region 324 in the virtual screen 32 are memorized with a correspondence established with respect to the copy destination region 323 in the virtual screen 31. As described above, since the corresponding relationships between the copy destination and the copy source are memorized, when the contents of the copy destination region 23 in the window 21 are required to be modified, a copy operation can be simply effected after a modify operation of the display contents is achieved in the window 22 without necessitating the operation to specify the positions and the sizes of the copy source region 24 and the copy destination region 23.

Figures 3, 4:
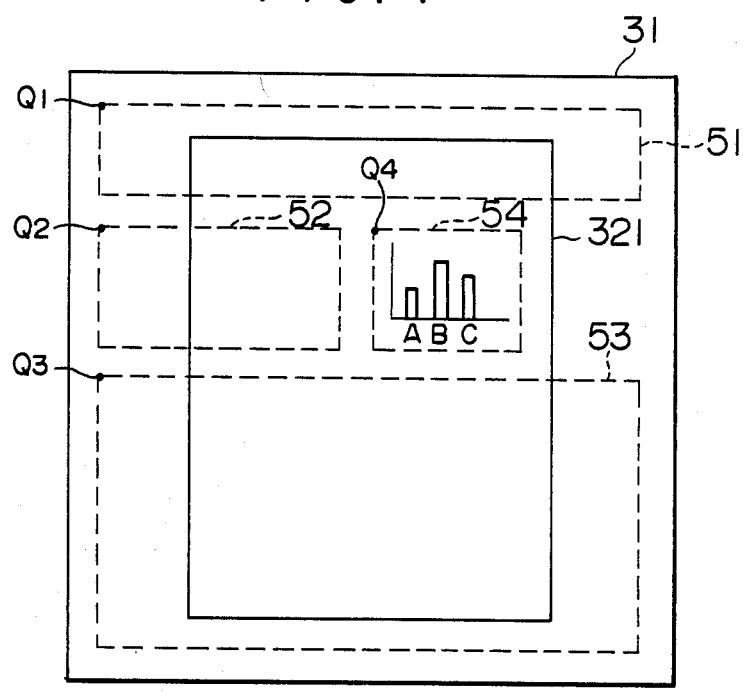
FIG. 3 is a schematic diagram illustrating an example of the window control table.
FIG. 4 is a schematic diagram illustrating a conceptual configuration of the virtual screen.

The operation to establish the windows 21-22 on the actual screen 7 and the control to output data from the virtual screens to these windows are effected by means of a window control program. To achieve the control of data output to the display screen, the window control program uses a window control table 40 as shown in FIG. 3, for example. The window control table 40 includes records W1, W2, etc. for each window, and each record comprises a display level 41 of the window in the display screen, X and Y coordinate values of a representative point of the window, for example, an upper-left corner of the window in the display screen, X and Y coordinate values 43 of the representative point in the virtual screen, and horizontal and vertical sizes 44 of the window along the abscissa and the ordinate. The window control program refers to the window control table 40 to output the contents of a particler region of the virtual screen to a particular location of the real screen 7. In the case where at least two windows have a positional relationship, for example, the windows overlap with each other in the real screen 7, a window having a lower display level 41 is partially concealed by a window having a higher display level 41. When a scroll instruction is issued for a window, the X and Y coordinate values 43 of the pertient record are changed in the scroll direction in the window control table 40 and the position of the partial region in the virtual screen to be displayed in the window is shifted. Since such a multiwindow control method has already been well known, details thereabout will not be described.

FIG. 4 is a schematic diagram illustrating the virtual screen 31 in detail. In the case where the operator generates a document including a text, a photo, a diagram, or a table, the document is split into a plurality of regions. The virtual screen 31 of FIG. 4 comprises four regions 51-54 having representative points $Q_1-Q_4$, respectively. For example, the regions 51 and 53 are used to display text data, the region 52 displays a table or image data, and the region 54 is assigned as a region to display a graph.

Figure 5:
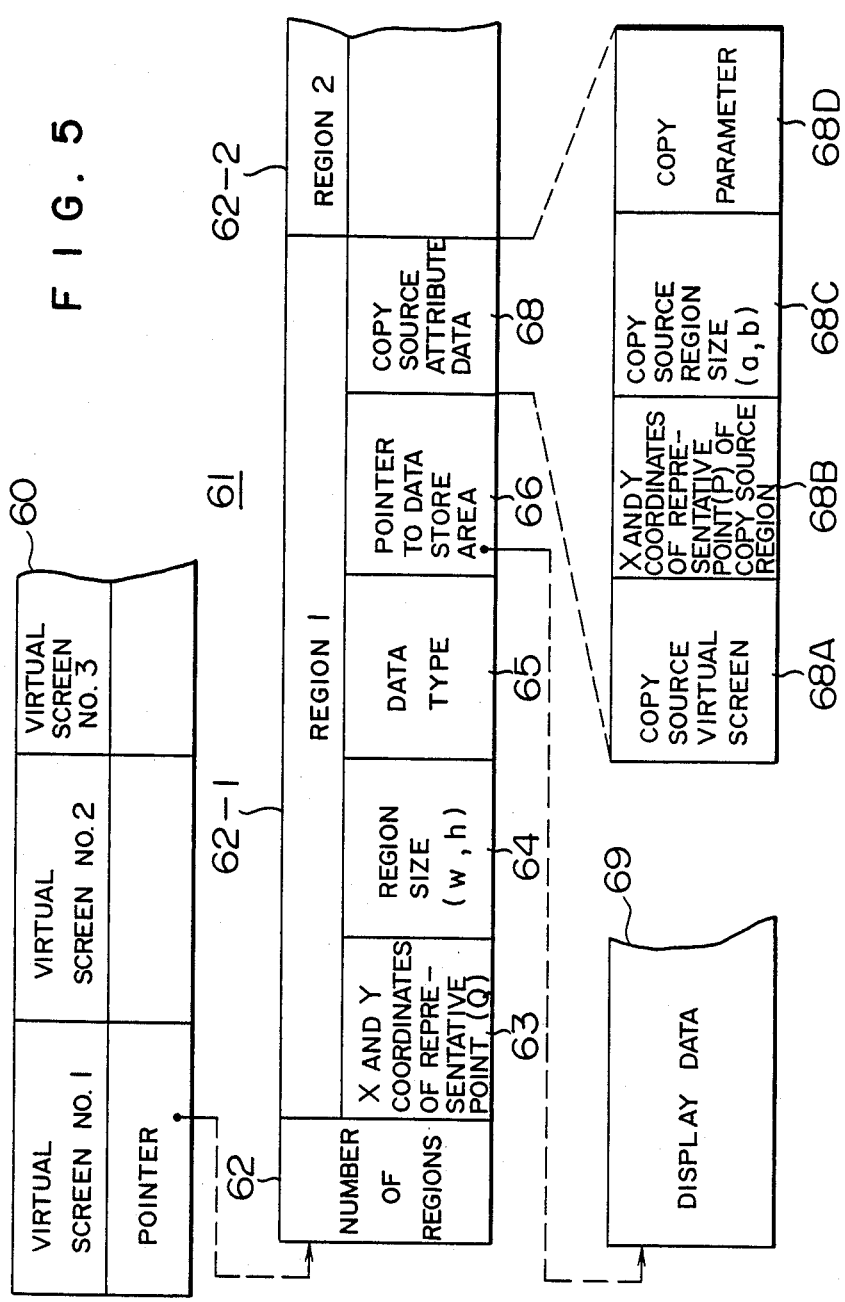
FIG. 5 is a schematic diagram illustrating an example of a data layout in the virtual screen.

FIG. 5 shows an embodiment of a data layout associated with the virtual screen 31 or 32 to be stored in the virtual screen memory 8. Reference numeral 60 indicates a header portion of each virtual screen and includes a pointer to point to a store position of a body 61 of a data record.

Each data record includes a field 62 indicating the number of regions contained in a virtual screen and a field 62-i denoting a definition data of each region. The region define field 62-i comprises X and Y coordinates 63 of the representative point ($Q_1-Q_4$ of FIG. 4) of the region, the vertical and horizontal sizes 64 of the region, a type (classification of a text, an image, or the like) 65 of data included in the region, a pointer 66 to a store area 69 of data to be displayed in the pertinent region, and a copy source attribute data 68. The copy source attribute data 68 is set when the display data of the region 61 is beforehand attained by a copy operation of another region (a copy source region) and includes, in the example of FIG. 5, a number 68A of a virtual screen in which the copy source region exists, X and Y coordinates 68B of the representative point (point P of FIG. 2) in the copy source region of the virtual screen 68A, a size 68C (a and b of FIG. 2) of the copy source region, and a copy parameter 68D. In place of the sizes of the copy source region, X and Y coordinates of the lower-right corner of the region may be recorded. The copy parameter 68D includes, for example, a parameter determining a layout relationship (e.g. a rotation angle) of the display contents between the copy source and the copy destination, a parameter indicating a data type used to select only a particular type of data from the display data of the copy source, or a parameter determining a logical operation (a replace operation, an OR logic, or the like) to be effected between the data existing in the copy destination region and the copy data to be copied thereinto. In the data store area 69, the display data of the region 62-1 is stored in a form of a string of character codes if the display data is a text and in a form of bit map data if the display data is an image.

Figure 6:
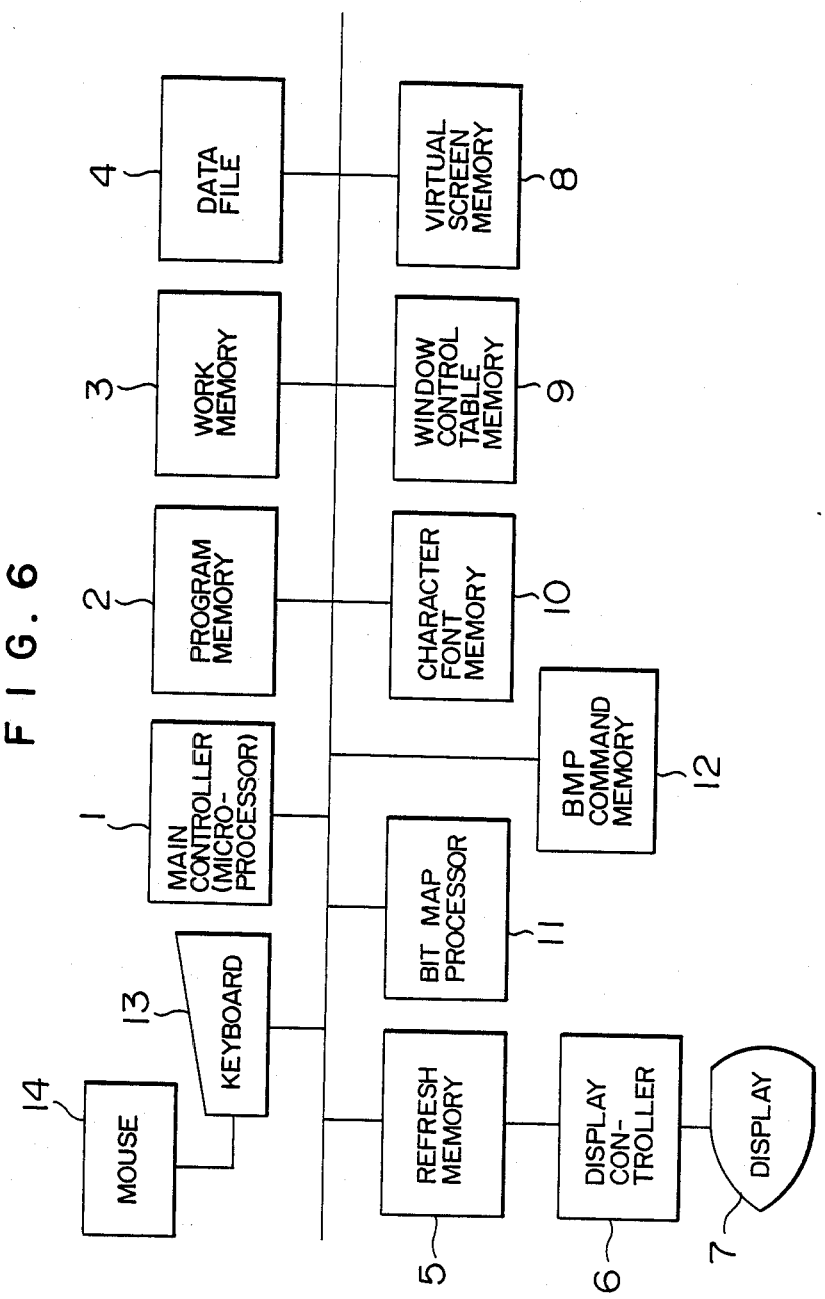
FIG. 6 is a schematic block diagram illustrating the overall configuration of the multiwindow system according to the present invention.

FIG. 6 is a block diagram illustrating the overall configuration of a document processing system to which the present invention is applied. This system includes a main controller (microprocessor) 1 controlling the overall operation of the system, a memory 2 storing various kinds of programs to be executed by the main controller 1, a work memory 3 temporarily storing data generated in a course of execution of programs, a data file 4 storing document data referenced or created in the system, a refresh memory (bit map memory) 5 storing data to be displayed in the display screen 7, a display controller 6 to sequentially read the contents of the refresh memory 5 and to output the contents to the display screen 7, a virtual screen memory 8 to store data records (FIG. 5) corresponding to the respective virtual screens, a memory 9 to store the window control table 40 of FIG. 3, a memory 10 to store character fonts corresponding to the character codes, a bit map processor 11 to develop the display data of the virtual screen in the refresh memory 5 in a form of a bit map, a memory 12 to store various commands used to operate the bit map processor 11, a keyboard 13 to input various control instructions and data to the system, and a pointing device (mouse) 14 to point to a position in the display screen 7 by means of a cursor.

Referring now to the program flowcharts of FIGS. 7-8, a description will be given of a control routine which is effected by use of the virtual screen data structure of FIG. 5 to achieve a document processing including a copy destination region.

Figure 7:
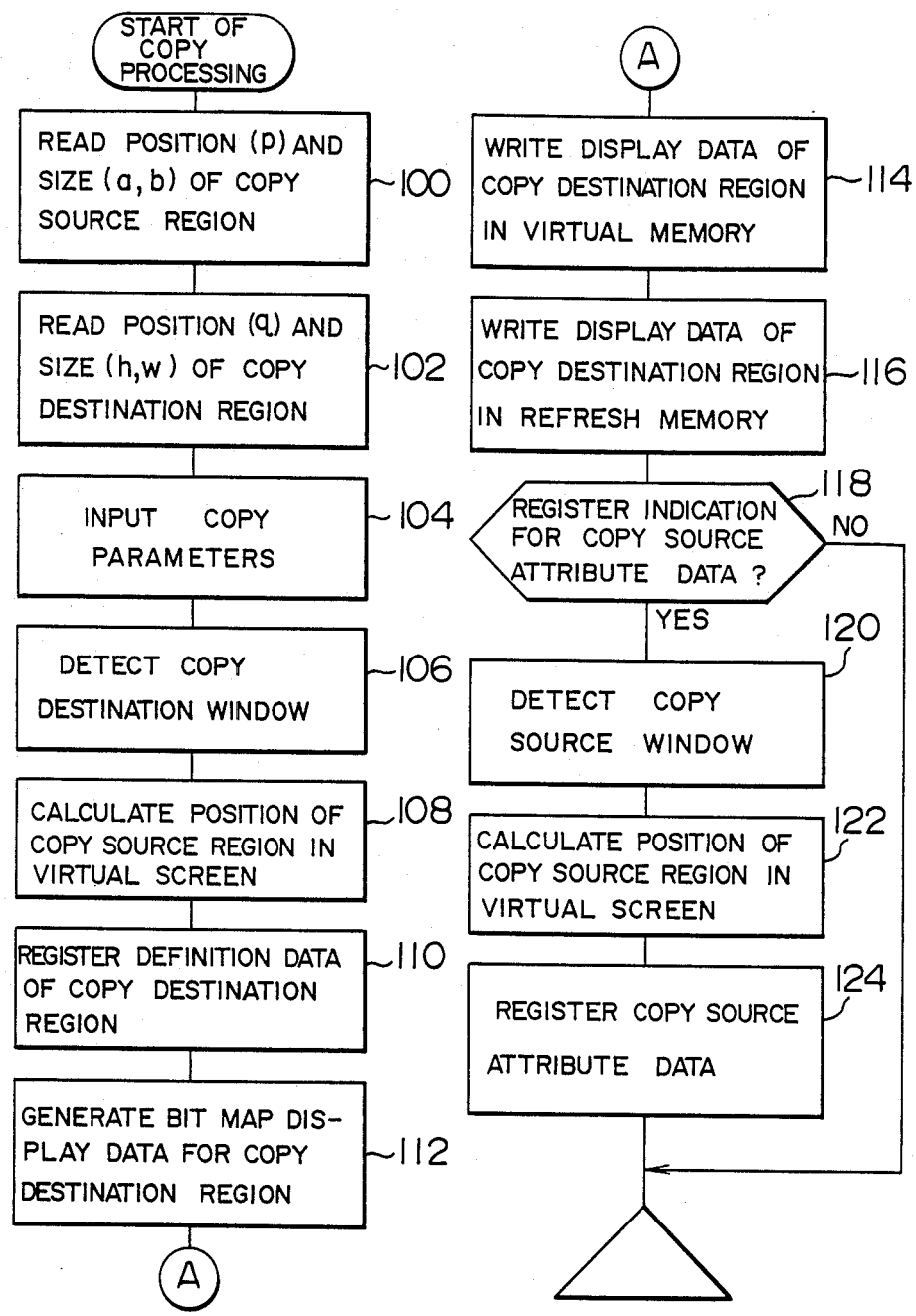
FIG. 7 is a program flowchart used when a copy request is issued to copy the contents of a copy source region into a copy destination region in a first embodiment of the document processing method of the present invention.

The control routine of FIG. 7 is executed in response to a copy request command inputted by the operator to copy the display contents of the second window into a partial region established in a document being generated in the first window. In the control routine, the position (P) of the copy source region 24 and the size (a, b) thereof designated by the operator in the second window are read [step 100] and then the position (q) and the size (h, w) of the copy destination region 23 designated by the operator in the first window are read [step 102]. The region size can be attained by use of the X and Y coordinate values of the upper-left and lower-right corners of the region designated by the operator by means of the mouse 14. Furthermore, when the operator completely input copy parameters in [step 104] to indicate the relationship between the display contents of the copy source region 24 and the copy destination region 23, the window control table 40 is searched for a record of a window 21 in which the copy destination region 23 is located [step 106] and then the position Q of the copy destination region 323 in the virtual screen 31 corresponding to the window 21 is calculated [step 108]. Next, a region define field (items 63-66) is added to define the copy destination region 23 thus established in the data record 61 related to the virtual screen 31 beforehand recorded in the virtual screen memory 8 [step 110]. In this case, the data type 65 indicates an image data. After the step 110, the bit map data located in the copy source region 24 of the refresh memory 5 is extracted and is subjected to a magnification or a reduction according to a size ratio between the copy source region 24 and the copy destination region 23, thereby obtaining the bit map data to be displayed in the copy destination region 23 [step 112]. The display data of the copy destination region 23 is written in the data store area 69 pointed by the pointer 66 in the copy destination region define field and in the copy destination region on the refresh memory 5 [steps 114 and 116]. When the contents of the refresh memory 5 is rewritten, the display screen 7 changes so that the contents of the copy source region 24 is displayed in the copy destination region 23 of the first window 21.

Next, in step 118, it is judged whether a request of registration of the copy source attribute data is present or absent. In the case where there exists a possibility of a later modification on the contents of the copy destination region 23 thus established, the operator inputs a command requesting a registration of the copy source attribute data prior to an input of a copy request command. This registration request command may be inputted when the contents of the copy data are displayed in the first window 21. If an input of the register command is found in the judge step 118, the window control table 40 is searched to detect a record of the window 22 where the copy soruce region 24 is located [step 120], the position of the copy source region 324 on the virtual screen 32 corresponding to the window 22 is calculated [step 122], and the copy source attribute data 68 comprising items 68A-68D is added to the copy destination region define field 62i [step 124], thereby completing the routine. When the register command is not inputted or when another command is inputted, the routine is terminated without executing the steps 120-124.

As described above, when the copy source attribute data is beforehand registered with a correspondence to the copy destination region, the modification of the display contents of the copy destination region becomes to be easier for the operator as follows. That is, the operator effects a modification operation of the display contents in the second window 22, locates the cursor to a position in the copy destination region 23 of the first window 21 by use of the mouse 14, and then inputs a command to instruct an automatic copy. The cursor operation may be here achieved after the automatic copy command is inputted.

Figure 8:
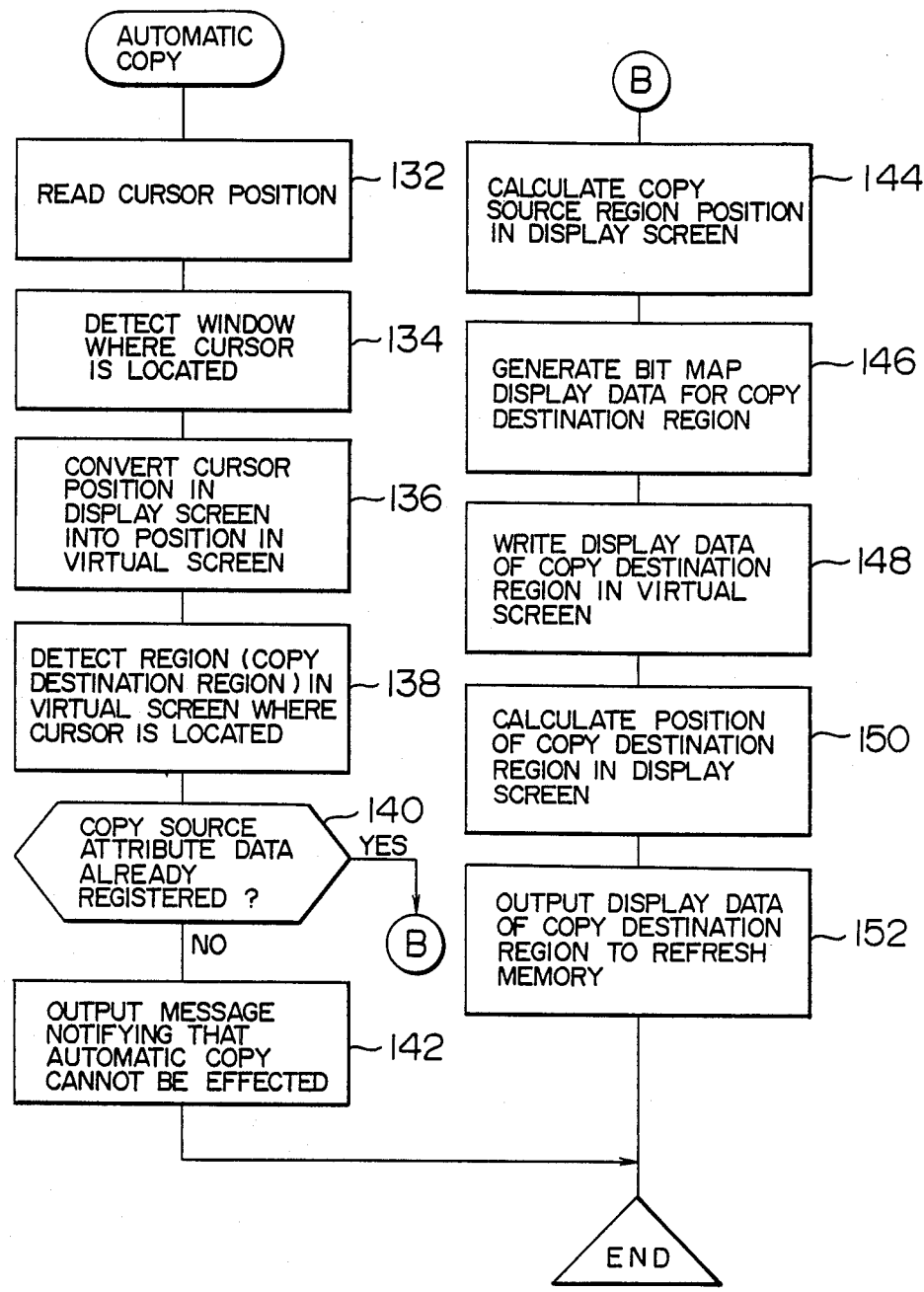
FIG. 8 is a program flowchart to be executed when an automatic copy request is issued to modify the contents of the copy destination region in the first embodiment of the present invention.

When an automatic copy command is inputted, the routine of FIG. 8 is executed. First, the position of the cursor is read [step 132] and the window control table 40 is searched to detect the window 21 in which the cursor is located [step 134]. When the window 21 is determined, the position of the cursor in the display screen can be converted into a position in the virtual screen 31 corresponding to the window 21 [step 136]. Furthermore, by searching the data record 61 corresponding to the virtual screen 31, the define field 62-i of the region (copy destination region) 323 including the position of the cursor in the virtual screen 31 can be detected [step 138], and hence it can be judged whether or not the copy source attributed data 68 has been registered to the region define field 62-i [step 140].

If the copy source attribute data 68 has not been registered, a message is outputted to notify that the automatic copy cannot be effected [step 142] and then the routine is terminated. If the copy source attribute data 68 has already been registered, the position of the representative point P in the copy source region is converted into a position p in the display screen by referencing the record in the window control table 40 corresponding to the virtual screen indicated by the item 68A [step 144]. Next, the bit map data of the copy source region in the refresh memory 5 defined by the region size indicated by the item 68c and the position p in the display screen is extracted and is subjected to a magnification or reduction processing according to the size ratio between the copy source region and the copy destination region, thereby generating the display data to be outputted to the copy destination region 23 [step 146]. The display data is written in a data area 69 indicated by the pointer 66 included in the copy destination region define field 62i of the virtual screen [step 148]. In addition, after the region representative point Q included in the copy destination region define field 62i is converted into a position q in the display screen by referencing the window control table 40 [step 150], the display data is written in the copy destination region in the refresh memory defined by the position q and the region size indicated by the item 64 [step 152]. Through the processing above, the display contents of the copy destination region 23 are modified on the display screen.

In the embodiment above, although the display contents of the second window are copied into a document generated in the first window, it is also possible to establish a plurality of copy destination regions in the first window so as to incorporate the display contents of a plurality of other windows into a document. According to the embodiment above, when modifying the contents of the copy destination region, the display contents modified in the copy source can be automatically copied without necessitating to specify again the positions and sizes of the copy source and destination regions. Consequently, there is provided an advantage that the operation of the operator is simplified in a document processing in which the copy operation is particularly repeated in a trial and error manner.

Next, a description will be given of a second embodiment of the present invention implemented by further modifying the first embodiment described above.

If the processing results obtained in the second window are incorporated into the first window and the resultant document is periodically issued, for example, the operator conventionally calls the application program previously used in the second window and reads the data previously used from the data file so as to temporarily restore the processing results having the contents identical to those of the copy destination region of the document previously generated, modifies a portion of the restored results, and then copies the obtained results into the document in the first window being processed. The similar operations are also necessary in the case where a processing job on a document is once terminated, the power supply of the document processing system is turned off, and then the document processing is restarted to modify the contents of the copy destination region of the document partially.

According to the second embodiment of the present invention, a call of the program used in a window as a copy source and a read of the data used from the file can be effected through a simple operation during a document processing associated with a copy destination region.

In order to accomplish the object, according to the present invention, an identifier of the program used in the copy source and an address of data record including data which are previously used in the copy source are stored in a data file with a correspondence to the copy destination. In addition, a program identifier corresponding to each window and a store address of the used data are stored in he window control table.

FIG. 9 shows the configuration of a window control table 40' used in the second embodiment of the present invention. Items 41-44 are the same as those of the first embodiment, reference numeral 45 indicates an identifier of an application program used in the window, and reference numeral 46 is a store address of data record constituting the display contents of the window. The program identifier above is registered to the window control table 40' corresponding to the window each time the window is established on the display screen.

In the window control table 40', the first address of the program in the program memory 2 may be stored in place of the identifier 45 of the program.

Also in the case of this embodiment, excepting that the copy source attribute data 68 is changed as shown in FIG. 10, each virtual screen corresponding to the window is stored in the virtual screen memory 8 in the same data layout as previously described in conjunction with FIG. 5.

The configuration of FIG. 10 comprises an identifier 68A' of a program used in the copy source, a store address 68A" of data record used in the copy source, and items 68B-68D identical to those of the first embodiment.

Figure 11:
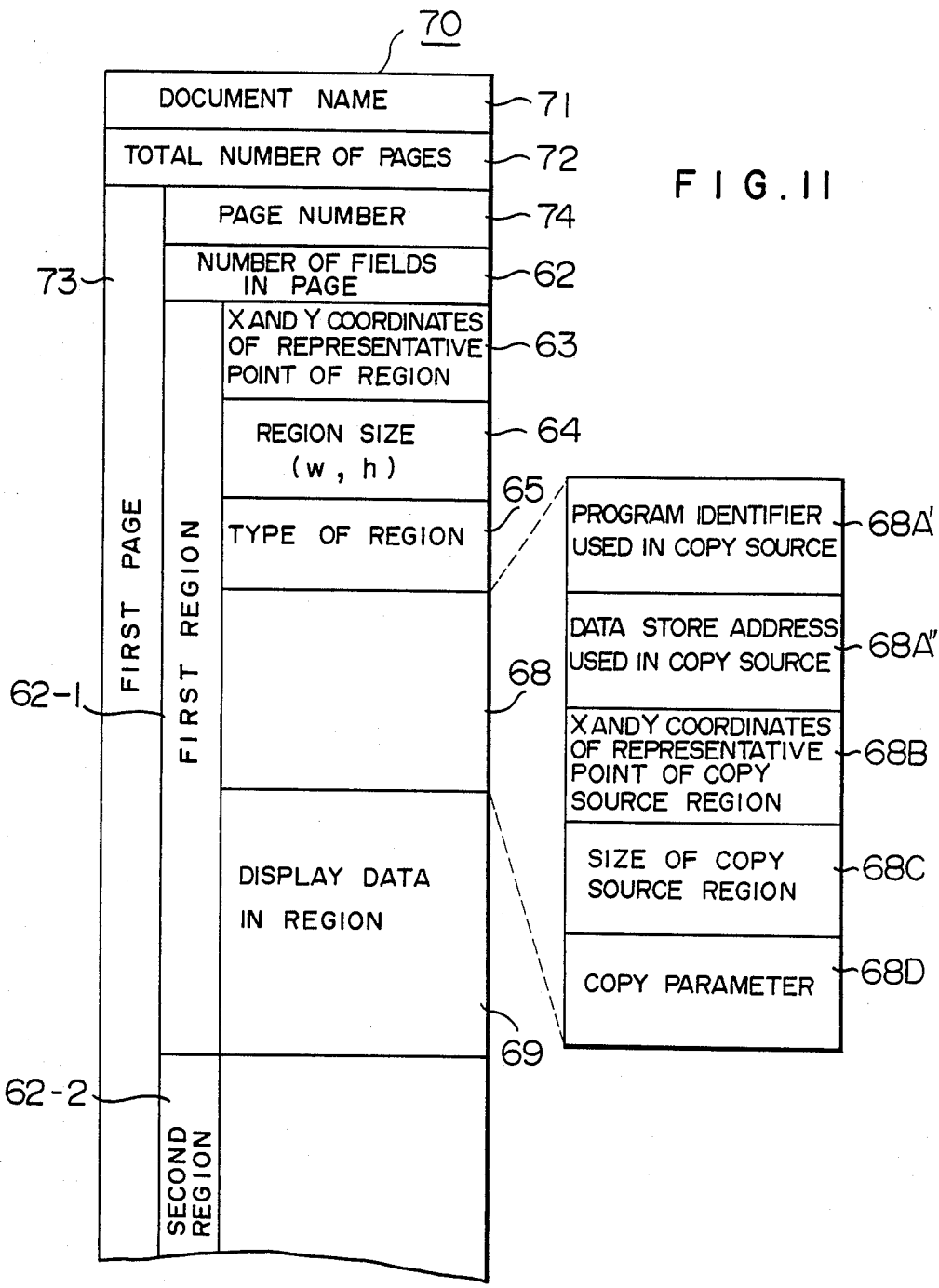
FIG. 11 is a schematic diagram illustrating the contents of a document data file in the second embodiment of the present invention.

FIG. 11 shows an example of the data structure of a document file 70 comprising a plurality of pages stored in the data file 4. The data structure of FIG. 11 includes a document name 71 used to identify a document or a document file and a page count 72 of pages constituting the document. The document data comprises a record 73 for each page and each page record 73 includes a page number 74 identifying the page, a region count 62 of regions constituting the document of the page, and define data 62-i for each region. Each region define data 62-i comprises items 63-68 and display data in region 69, which corresponds to the data items of the virtual screen. Although the display data in region 69 and the data items 63-68 are indicated to be allocated in a consecutive store area in FIG. 11, the display data 69 may be stored in another file area to be designated by a pointer.

The document processed in the first window described above is added as a new page record 73 to the document file 70. The copy source data (the processing result in the second window) copied in the document is stored in the data file 4 in a format varying depending on the kind of the copy source application program. Here, as an example, the format in the case where the copy source data is graph data is shown in FIG. 17.

The diagram of FIG. 17 includes a file name 171 identifying the data file and the total number of data 172 existing in the file. The graph file comprises records 191, 192, etc. for each graph data and each of the records 191, 192, etc. can be identified by a data number 173. The configuration further includes a graph type 174 indicating the type of graph such as a bar chart or a broken-line graph, a character string of the graph title 175, a character string 176 representing the unit of the abscissa, a character string of the header of the abscissa 177, a character string 179 denoting the unit of the ordinate, and a character string of the header of the ordinate 180. Reference numerals 181A, 182A, etc. indicate names of intervals to be displayed below the ordinate, whereas reference numerals 181B, 182B, etc. are graph values corresponding to the interval names 181A, 182A, etc., respectively.

Referring now to FIGS. 12-16, a description will be given of a control routine for the document processing in the second embodiment of the present invention.

Figure 12:
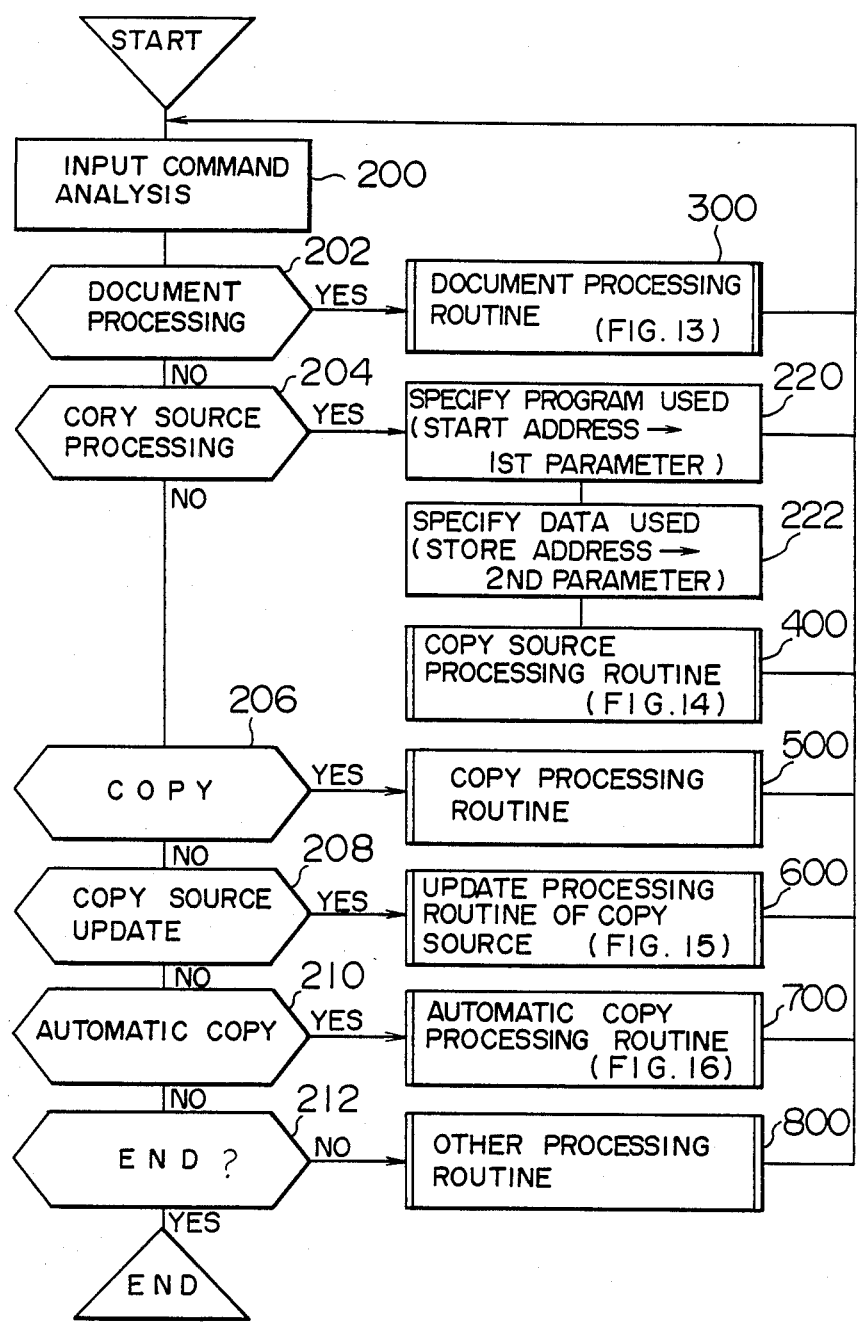
FIG. 12 is a program flowchart to be effected in the second embodiment of the present invention.

FIG. 12 is a flowchart of the control program used to select a routine in the multiwindow system. When the operator inputs a command from the input device 13 or 14, the command is interpreted in step 200 and a processing routine is selected depending on the kind of the command in steps 202-212. For a document processing command, a document processing routine which will be described in conjunction with FIG. 13 is executed.

Figure 14:
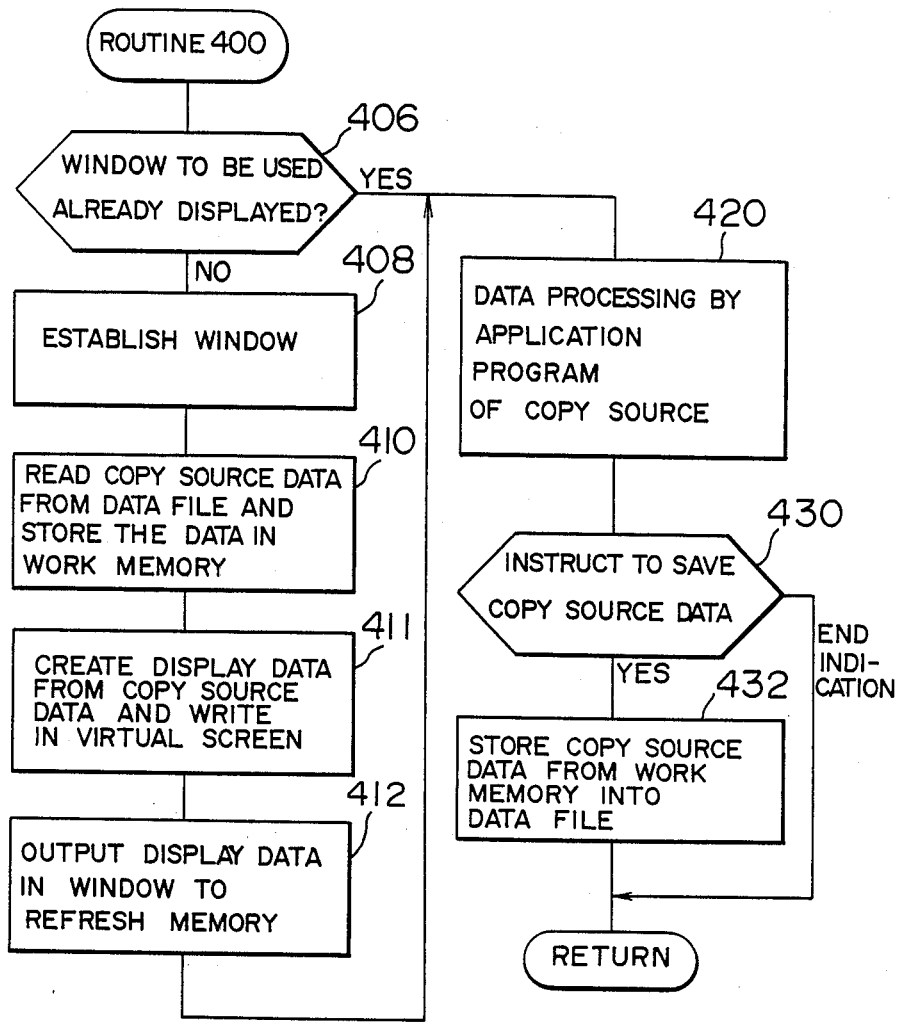
FIG. 14 is a program flowchart illustrating in detail a copy source region processing routine 400 of FIG. 12.
Figure 15:
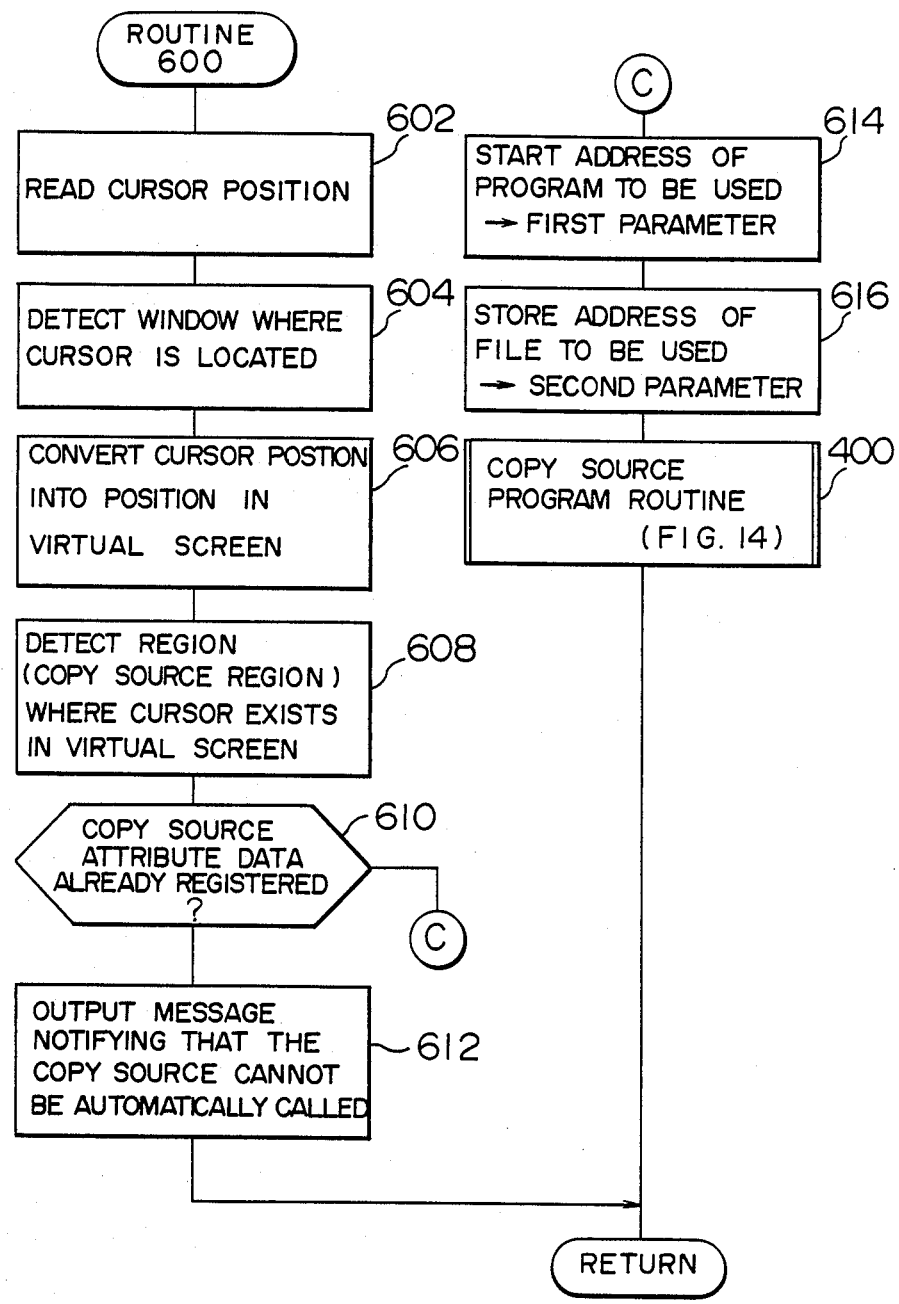
FIG. 15 is a program flowchart illustrating datails of a copy source update processing routine 600 of FIG. 12.
Figure 16:
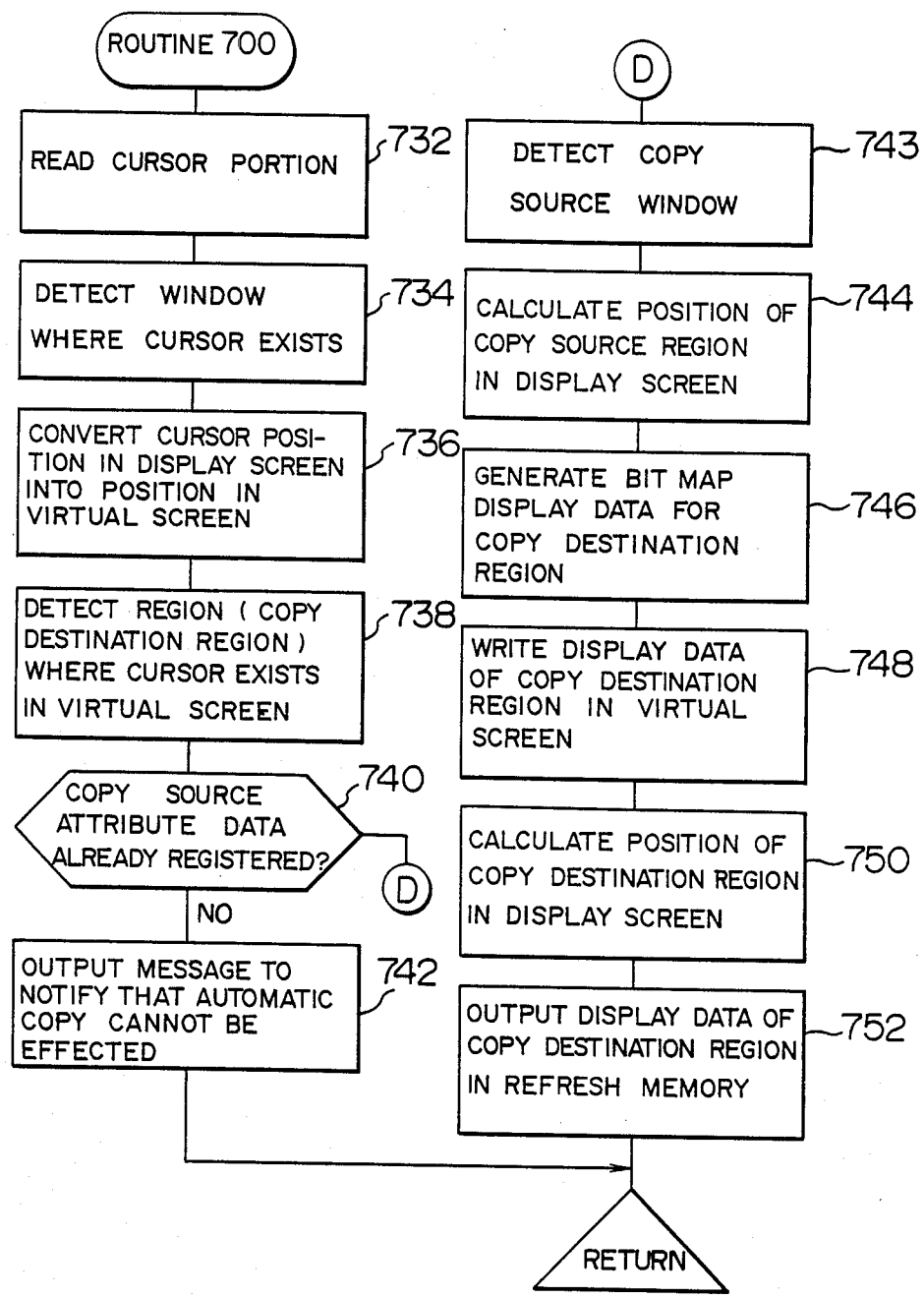
FIG. 16 is a program flowchart illustrating in detail an automatic copy processing routine 700 of FIG. 12.

In the case of a command instructing a copy source processing, the operator specifies a program to be used and copy source data (a file name and a data number). When the program to be used is specified, the start address of the program is stored as the first parameter [step 220]. For the specification of the copy source data, a store address of data obtained by referencing the directory of the data file is stored as the second parameter [step 222] and then a routine 400 which will be described in conjunction with FIG. 14 is executed. When a command instructing a copy is inputted, a copy processing routine 500 is executed, for an input of a command indicating a copy source update, a routine 600 which will be described in conjunction with FIG. 15 is effected; and when a command indicating an automatic copy is supplied, a routine 700 which will be described with reference to FIG. 16 is executed. Furthermore, in response to an input of an end command, the program is terminated; whereas when other than the commands above is inputted, a processing routine 800 corresponding to the command is executed.

Figure 13:
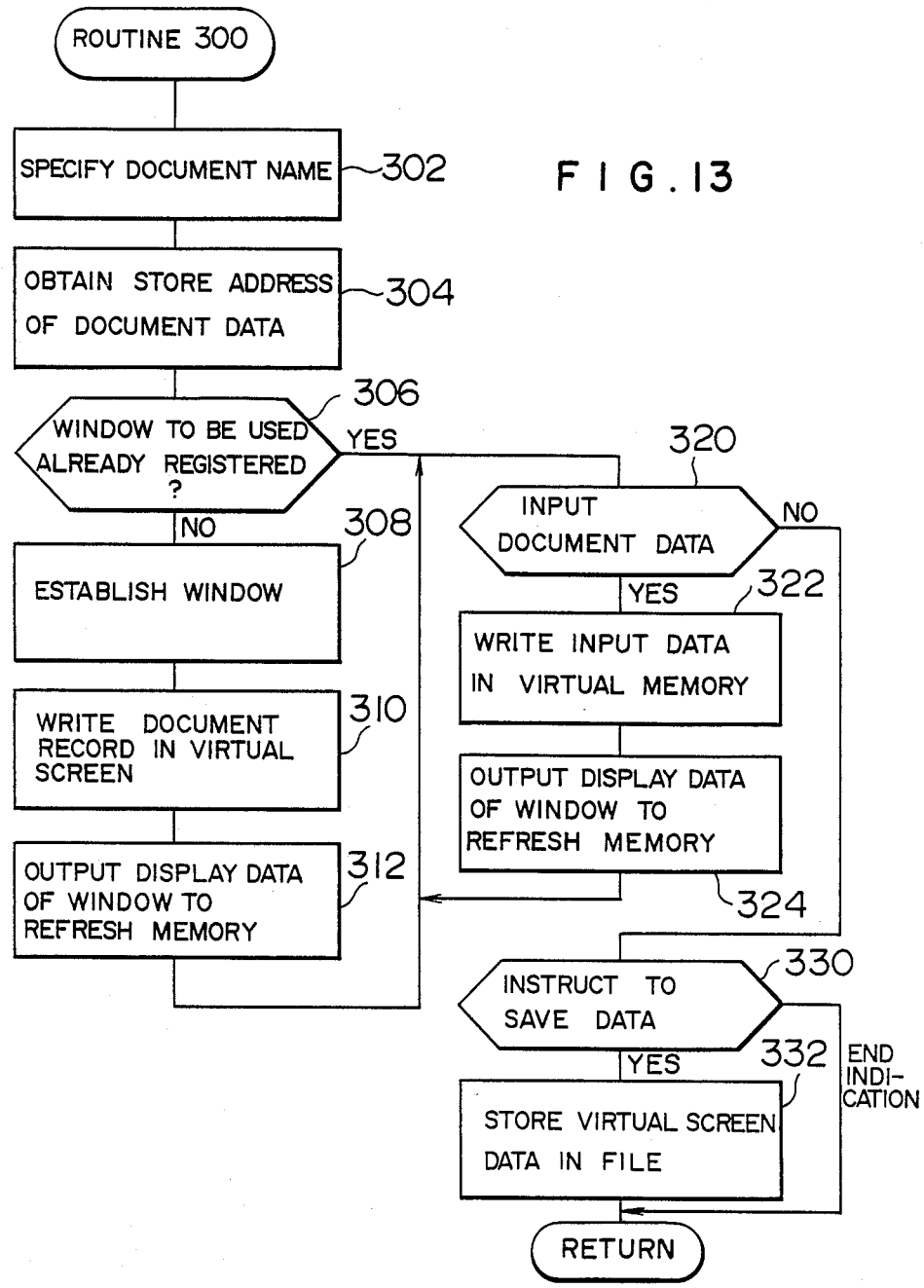
FIG. 13 is a program flowchart illustrating details of a document processing routine 300 of FIG. 12.

In the document processing routine 300, as shown in FIG. 13, when the operator first specifies the document name (a document file name and a page number) [step 302], the directory of the data file 4 is referenced to attain a store address of document data [step 304]. Next, it is judged whether or not the window to be used in the current document processing has already been set on the display screen [step 306]. If the window has not been established, a new window record is registered to the window control table 40' [step 308]. In this case, the standard values are assigned to the values of the window position 42-43 and the size 44, the identifier of the document processing program is used for the program identifier 45, and the value attained in the step 304 is adopted as the data store address 46. The document record is read from the document file into the virtual screen in step 310 and then data in the window region of the virtual screen is developed in the refresh memory 5 in step 312. Consequently, if the operator specifies an existing document, the contents thereof are displayed in the window of the display screen; and if a new document is specified by the operator, a virgin window which has not been processed is displayed. Steps 320-324 form a known document processing routine for effecting a text generate processing in response to a data inputted by the operator in which the input data is written in the virtual screen and the dot data in the window region is updated. When the operator instructs to save the document data after the document processing is finished, a processing is effected to store the contents of the virtual screen in the format of FIG. 11 at a specified address of the data file 4 [step 330-332].

FIG. 14 is a flowchart of the copy source processing routine 400. Steps 406-408 of this routine are identical to the step 306-308 of the routine 300. In step 410, based on the file address of the copy source data supplied as the second parameter, the copy source data is read from the data file 4 and is located in the work memory 3. In step 411, a display data is created on the basis of the copy source data in the work memory 3 and written into the virtual screen. In step 412, the data in the window region of the virtual screen is developed in the refresh memory 5. In step 420, based on the input data, the contents of the window are modified and the copy source data in the work memory 3 is updated by the function of the application program. When the operator instructs to save the copy source data after the update operation of the copy source region is finished, a processing is achieved to store the copy source data from the work memory 3 into the data file 4 beginning from a specified address [steps 430 and 432].

Incidentally, the concrete processing contents of the steps 410-432 of FIG. 14 vary depending on a copy source application program specified by the first parameter. The kinds of application programs of the copy source may include a graph generate routine, a table create routine, and the like. The concrete processing of the steps 410-432 will be here described as an example of a graph generate routine. In the step 410, based on the address of the copy source data supplied as the second parameter, data 191 for example is read from the data file 4 and is located in the work memory 3. In the step 411, based on the graph data 191 in the work memory 3, the character string data is written as a character region data on the virtual screen and the graphic data such as for a direct line is written therein as a graphic region data. In the step 412, a processing common to all application program is executed. In the step 420, on receiving data inputted by the operator corresponding to the graph data 174-182, the program generates a graph based on the updated data. In this operation, an updating is effected on the pertinent items of the graph data 174-182 in the work memory 3 corresponding to the input data. Step 420 is a processing common to all application programs. In step 432, the graph data in the work memory 3 are stored as data 191, 192, etc. in the data file 4.

The copy processing routine to be effected in response to the copy command is similar to the copy processing routine of the first embodiment described in conjunction with FIG. 7. However, in the case of the second embodiment, the contents of the copy source attribute data to be added to the data record of the copy destination region in the step 124 of FIG. 7 is modified as shown in FIG. 10 to include the program identifier 68A' used in the copy source and the store address 68A" of data record used in the copy source. These items 68A' and 68A" can be obtained from the window control table 40'.

FIG. 15 is a program flowchart of the copy source update processing routine 600. This routine is effected when a change takes place in the display contents of a copy destination region included in the document being display in the first window. When the operator inputs a command to indicate a copy source updating and then points to an arbitrary point in the copy destination region 23 of the first window 21 by use of the cursor, the position of the cursor is read [step 602], and a window (the first window 21 in this case) in which the cursor is located is detected [step 604]. Next, the position of the cursor in the display screen is converted into a position in a virtual screen corresponding to the window 21 [step 606] and the data record of the virtual screen memory is searched so as to detect a subregion (the copy destination region 23 in this case) where the cursor is located [step 608]. If the copy source attrubute data 68 has not been registered to the define field 62i associated with the copy destination region 23, a message is outputted to notify that the automatic call of the copy source cannot be effected, thereby terminating the routine [steps 601-612]. If the copy source attribute data has been registered, the first address of the program identifier 68A' registered is obtained and is set to the first parameter [step 614], the store address 68A" of the data record used in the copy source is set to the second parameter [step 616], and then the copy source processing routine 400 of FIG. 14 is executed. This enables to effect an automatic operation to call an application program necessary for the data modification of the copy source and to display the copy source data in the second window. Consequently, the operator is enabled to immediately initiate the copy source data modification processing in the second window 22.

FIG. 16 is a flowchart of the automatic copy processing routine 700. Steps 732-742 and 744-752 are identical to the steps 132-142 and 144-152 of the automatic copy processing in the first embodiment described in conjunction with FIG. 8. In the second embodiment, since the copy source window name 68A has not been registered to the copy source attribute data 68, the window control table 40' is subjected to a retrieval in step 743 to find a window record having a pair of the program identifier and the data store address respectively registered to the items 68A' and 68A", thereby determining the second window 24.

According to the second embodiment described above, in the case where a change is required in a copy portion of a document generated by copying thereto the processing results obtained in another window, the window of the copy source can be automatically restored through a simple operation to point to a copy region (the copy destination region) in the document by use of a pointing device, which therefore greatly improves the operability of the document processing.

Although the display data of the copy destination region to be stored in the virtual screen or the data file is in a format of bit map data (image) in this embodiment, the pertient code data may be extracted from the virtual screen of the copy source corresponding to the copy source region so as to be stored as the display data in the copy destination region.

While the present invention has been described with reference to the particular illustrative embodiments, but it is not restricted by those embodiments but only by the appended claims. It is to be appreciated that those skilled in the art can change and modify the embodiments without departing from the scope and spirit of the invention.

We claim:

1. A document processing method using a multiwindow including a display device having a display screen on which a plurality of windows are established and virtual screen memory means for forming a plurality of virtual screens corresponding to the windows, said method comprising the steps of:
   a first step for memorizing, in a virtual screen in the virtual screen memory means corresponding to a first window established on the display screen, copy source attribute data including an identifier of a second window established on the display screen and data defining a second partial region in the second window in correspondence with a first partial region in the first window established on the display screen;
   a second step for outputting to the second window results of data processing effected by use of a program; and
   a third step, responsive to a command inputted by an operator while pointing to an arbitrary point within the first partial region displayed in the first window, for copying the display contents of the second partial region of the second window into the first partial region of the first window based on the copy source attribute data previously memorized corresponding to the first partial region.

2. A document processing method according to claim 1 wherein the first step is executed in response to a command inputted by the operator while specifying a first partial region as a copy destination in the first window and a second partial region as a copy source in the second window.

3. A document processing method according to claim 2 wherein when a command associated with designation of the first partial region and the second partial region is inputted, display contents of the second partial region as the copy source are copied into the first partial region as the copy destination in the display screen.

4. A document processing method using a multiwindow system including a display device having a display screen in which a plurality of windows are established, virtual screen memory means for forming a plurality of virtual screens each of which stores display data obtained by executing a program corresponding to the virtual screen, memory means for storing a window control table to define a corresponding relationship between said virtual screens and said windows, control means for referencing the window control table to output display data in a predetermined region of said virtual screen to a window corresponding to the virtual screen, and data file means for storing data records corresponding to the virtual screens, said method comprising the steps of:
   a first step for storing copy source attribute data in a virtual screen in said virtual screen memory means corresponding to a first window established on the display screen with a corresponding with respect to a first partial region on the virtual screen, said copy source attribute including an identifier of a program to generate display information to be copied into the first partial region, a store address of a data record in the data file means to be used by the program, and data defining a second partial region on a virtual screen in which results of execution of the program are stored and
   second step, responsive to an operation achieved by an operator to input a command indicating to call a copy source into the display screen while pointing to an arbitrary point within the first partial region displayed in the first window, for activating a program indicated by the copy source attribute data stored in a virtual screen corresponding to the first window and for outputting to a second window in the display screen display information obtained by processing data read from the address.

5. A document processing method according to claim 4 further comprising the steps of:
   a third step for modifying the display contents of the second window according to operations of the operator; and
   a fourth step, responsive to an operation achieved by an operator to input a command indicating to copy the display data of the copy source into the first partial region, for referencing the copy source attribute data to copy the display contents of the second partial region in the second window into the first partial region of the first window.

6. A document processing method according to claim 4 wherein the first step is executed in response to a command inputted by the operator while specifying a first partial region as a copy destination in the first window and a second partial region as a copy source in the second window.

7. A document processing method according to claim 4 wherein said first step is effected in a course of an operation to display in the first window data read from the data file means.

8. A document processing method according to claim 6 wherein when a command associated with designation of the first partial region and the second partial region is inputted, display contents of the second partial region as the copy source are copied into the first partial region as the copy designation in the display screen.

9. A multiwindow system in which a plurality of windows including at least first and second windows are established on a display screen and the contents of a second partial region in said second window can be copied
   a first partial region in said first window comprising:
   a display device having said display screen on which said plurality of windows are established;
   first memory means for forming a plurality of virtual screens which are respectively provided corresponding to said plurality of windows with first and second virtual screens corresponding to said first and second windows respectively and each of which stores display data obtained by the execution of a program, said first virtual screen storing copy source attribute data inclusive of an identifier of said second window and define data of said second partial region in correspondence with said first partial region;

second memory means for storing a window control table which defines a corresponding relationship between said plurality of virtual screens and said plurality of windows;

input means for inputting a position on said display screen and an operation command; and a data processor, responsive to the operation command inputted from said input means by an operator with one of said plurality of windows being specified, for executing a predetermined program to output the results of data processing to the specified window and one of said plurality of virtual screens corresponding thereto, said data processor operating to copy the display contents on said second partial region of said second window into said first partial region of said first window on the basis of the copy source attribute data stored in said first virtual screen when a predetermined command is inputted from said input means while said first partial region of said first window on said display screen is designated.

10. A multiwindow system in which a plurality of windows including at least first and second windows are established on a display screen and the contents of a second partial region in said second window can be copied a first partial region in said first window, comprising:

a display device having said display screen on which said plurality of windows are established;

first memory means for forming a plurality of virtual screens which are respectively provided corresponding to said plurality of windows and each of which stores display data obtained by the execution of a program;

second memory means for storing a window control table which defines a corresponding relationship between said plurality of virtual screens and said plurality of windows;

data file means for reserving the contents of each of said plurality of virtual screens;

input means for inputting a position on said display screen and an operation command; and a data processor, responsive to the operation command inputted from said input means by an operator with one of said plurality on windows being specified, for executing a predetermined program to output the results of data processing to the specified window and one of said plurality of virtual screens corresponding thereto, wherein said first memory means stores copy source attribute data in one of said plurality of virtual screens corresponding to said first window in correspondence with said first partial region, said copy source attribute data including an identifier of a program to be executed for said second window, a store address of data in said data file means to be used by said program, and data which defines said second partial region, and wherein said data processor is responsive to the inputting of a predetermined command from said input means by an operator with said first partial region of said first window on said display screen for referring to the virtual screen corresponding to said first window, activating a program indicated by said copy source attribute data, processing data read from said store address and outputting, display information obtained by the data processing, to said second window.

* * * * *

UNITED STATES PATENT AND TRADEMARK OFFICE
CERTIFICATE OF CORRECTION

PATENT NO. : 4,829,294

DATED : May 9, 1989

INVENTOR(S) : Hidefumi Iwami, et al.

It is certified that error appears in the above—identified patent and that said Letters Patent is hereby corrected as shown below:

In claim 4, at column 14, line 8, "corresponding" should be "correspondence".

Signed and Sealed this

Seventeenth Day of October, 1989

Attest:

DONALD J. QUIGG

*Attesting Officer*   *Commissioner of Patents and Trademarks*